(No Model.)

I. H. BARTHOLOMEW.
SECONDARY BATTERY ELECTRODE.

No. 493,007. Patented Mar. 7, 1893.

Witnesses:
J. N. Shumway
N. E. Cole.

Isaac H. Bartholomew
Inventor
By atty.
Earle Seymour

UNITED STATES PATENT OFFICE.

ISAAC H. BARTHOLOMEW, OF NORTHFORD, CONNECTICUT.

SECONDARY-BATTERY ELECTRODE.

SPECIFICATION forming part of Letters Patent No. 493,007, dated March 7, 1893.

Application filed May 31, 1892. Serial No. 434,843. (No model.)

*To all whom it may concern:*

Be it known that I, ISAAC H. BARTHOLOMEW, of Northford, in the county of New Haven and State of Connecticut, have invented a new Improvement in Secondary-Battery Electrodes; and I do hereby declare the following, when taken in connection with accompanying drawings and the letters of reference marked thereon, to be a full, clear, and exact description of the same, and which said drawings constitute part of this specification, and represent, in—

Figure 1:
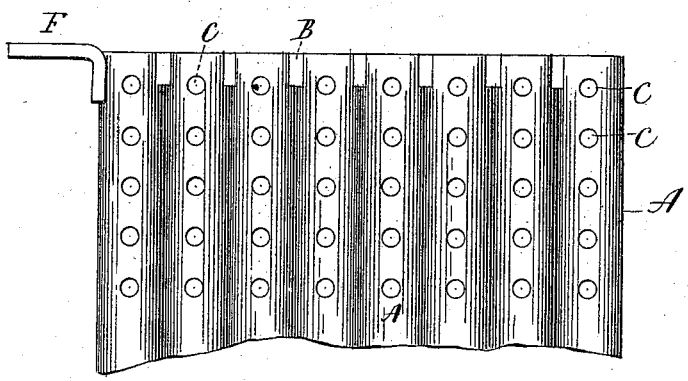
Figure 2:
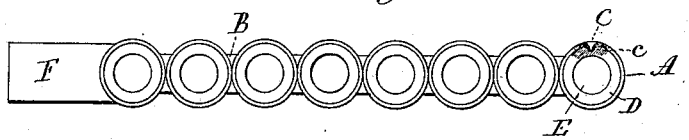

Figure 1, a plan view of an electrode constructed in accordance with my invention. Fig. 2, a view thereof in side elevation.

My invention relates to an improvement in secondary battery electrodes, the object being to produce a simple, durable and inexpensive electrode having a very large exposure of active material for its weight.

With these ends in view my invention consists in an electrode having certain details of construction, as will be hereinafter described, and pointed out in the claims.

As herein shown, the electrode is composed of a straight series of parallel lead pipes, A, secured together by bonds B, of solder. These tubes are inwardly upset and pierced as at C, to form hollow burrs, or conical retaining points *c*, upon their inner surfaces for binding in place linings D, of active material, which is applied to the said surfaces. This active material may be of any approved composition. It is applied in a plastic state and packed and formed by means of a cylindrical core, which is passed centrally through the tubes for the purpose. In lining the tubes as described, the composition will form around the said burrs, which will thereafter hold it in place. Some of it will squeeze into them if they are pierced, and further anchor the linings in place. The burrs or retaining points *c*, also operate to keep the said core properly centered in the tubes during the lining of the same. The longitudinal openings E, of the lined tubes, provide for a free circulation through them of the electrolyte in which the electrode is immersed. The active material is thus disposed in tubular form upon the lead, and a large area of it is exposed in proportion to the amount of lead used. Moreover, it has the strength of all tubular structures, and is much less liable to be broken or scaled off than when applied as the active material ordinarily is, in secondary battery electrodes.

The electrode is provided at one end with an arm, F, which is not only employed to support it, but also to convey away the current. The inwardly projecting burrs or retaining points of the tubes may be formed in any desired manner, such for instance, as by piercing them from the outside with a tool constructed so as not to remove any material, but to push it inwardly so as to project from their inner surfaces, as described. I do not limit myself, however, to piercing the inward projections, upset from the tube, but prefer to do so; nor do I limit myself to arranging the tubes in any particular way, nor making them independently, and binding them together by solder, as I may cast them in one piece. I would, therefore, have it understood that I do not limit myself to the exact construction herein shown and described, but hold myself at liberty to make such changes and alterations as fairly fall within the spirit and scope of my invention.

I am aware that it is old to make a battery electrode by placing active material of suitable nature within a lead tube transversely perforated to permit the electrolyte in which the electrode is immersed to have access to the active material. I believe, however, that I am the first to apply the active material to the inner surface of a lead tube in the form of a tubular lining, and to hold the same in place by burrs or retaining points formed by inwardly upsetting the tube from the outer surface thereof, whether to the extent of piercing the tube or not.

Having fully described my invention, what I claim as new, and desire to secure by Letters Patent, is—

1. A secondary battery electrode, composed of a group of lead tubes, inwardly upset from their outer surfaces to form inwardly projecting retaining points or burrs, and tubular linings of active material, for the respective tubes in which they are held in place by the said burrs or retaining points of the same, each tube having when completed a central circular opening extending throughout its length, substantially as set forth.

2. A secondary battery electrode composed of a group of lead tubes inwardly upset and pierced from their outer surfaces to form inwardly projecting retaining points or burrs, and tubular linings of active material for the respective tubes in which they are held by the said burrs or retaining points, each tube having when completed a central circular opening extending throughout its length, substantially as set forth.

In testimony whereof I have signed this specification in the presence of two subscribing witnesses.

ISAAC H. BARTHOLOMEW.

Witnesses:
EDWARD SMITH,
G. A. SMITH.